(12) United States Patent
Clarkson et al.

(10) Patent No.: US 7,321,710 B2
(45) Date of Patent: Jan. 22, 2008

(54) APPARATUS FOR PROVIDING OPTICAL RADIATION

(76) Inventors: William Andrew Clarkson, 36 Rushington Avenue, Totton, Southampton, SO40 9DB, Hampshire (GB); David Neil Payne, 13 Sylvan Road, Hamble, Southampton, Hampshire, SO31 4QG (GB); Malcolm Paul Varnham, 76 Grange Road, Alresford, Hampshire, SO24 9HE (GB); Mikhail Nicholaos Zervas, 34 Hill Farm Road, Southampton, Hampshire, SO15 5SR (GB)

( * ) Notice: Subject to any disclaimer, the term of this patent is extended or adjusted under 35 U.S.C. 154(b) by 0 days.

(21) Appl. No.: 10/544,551

(22) PCT Filed: Feb. 6, 2004

(86) PCT No.: PCT/GB2004/000445

§ 371 (c)(1),
(2), (4) Date: Aug. 5, 2005

(87) PCT Pub. No.: WO2004/070897

PCT Pub. Date: Aug. 19, 2004

(65) Prior Publication Data

US 2006/0204188 A1    Sep. 14, 2006

(30) Foreign Application Priority Data

Feb. 7, 2003 (GB) .................................. 0302855.2
Mar. 19, 2003 (GB) .................................. 0306281.7

(51) Int. Cl.
*G02B 6/02* (2006.01)
(52) U.S. Cl. ........................ 385/123; 385/31

(58) Field of Classification Search ............... 385/123, 385/31
See application file for complete search history.

(56) References Cited

U.S. PATENT DOCUMENTS

| | | | | |
|---|---|---|---|---|
| 4,820,010 A * | 4/1989 | Scifres et al. | ................. | 385/43 |
| 5,734,766 A * | 3/1998 | Flint | ........................... | 385/43 |
| 5,852,692 A * | 12/1998 | Nightingale et al. | .......... | 385/43 |
| 6,434,302 B1 | 8/2002 | Fidric et al. | | |
| 6,628,695 B1 * | 9/2003 | Aldaz et al. | .................. | 372/96 |
| 6,693,926 B2 * | 2/2004 | Cayrefourcq et al. | ......... | 372/14 |
| 6,973,234 B2 * | 12/2005 | Hasegawa et al. | ............ | 385/31 |
| 2002/0126479 A1 * | 9/2002 | Zhai et al. | .................. | 362/244 |

FOREIGN PATENT DOCUMENTS

| | | |
|---|---|---|
| EP | 0 893 862 A2 | 1/1999 |
| WO | WO 93/15536 | 8/1993 |

* cited by examiner

*Primary Examiner*—Ellen E. Kim
(74) *Attorney, Agent, or Firm*—Reidlaw, L.L.C.; John S. Reid

(57) ABSTRACT

Apparatus for providing optical radiation (10) comprising a pump array (8) for providing pump radiation (7), a first pump combiner (1), and a waveguide (3), wherein the pump radiation (7) from the pump array (8) is coupled into the waveguide (3) via the first pump combiner (1), and wherein the waveguide (3) comprises a pump guide (4) for guiding the pump radiation (7), and a gain medium (5) which emits the optical radiation (10) when it is pumped by the pump radiation (7).

26 Claims, 10 Drawing Sheets

APPARATUS FOR PROVIDING OPTICAL RADIATION

FIELD OF INVENTION

This invention relates to an apparatus for providing optical radiation. The apparatus can take various forms, for example a laser, a Q-switched laser, or a master oscillator power amplifier. The invention has application for materials processing.

BACKGROUND TO THE INVENTION

Pulsed neodymium yttrium aluminium garnet (NdYAG) lasers are widely used in industrial processes such as welding, cutting and marking. Care has to be taken in these processes to ensure that the plasmas generated by the laser does not interfere with the incoming laser pulses. The relatively low pulse repetition rates (6 kHz) at high peak powers that are achievable in a NdYAG laser have led to their wide application in laser machining.

Fibre lasers are increasingly being used for materials processing applications such as welding, cutting and marking. Their advantages include high efficiency, robustness and high beam quality. Examples include femtosecond lasers for multiphoton processing such as the imaging of biological tissues, Q-switched lasers for machining applications, and high-power continuous-wave lasers. Their disadvantage is their relatively low energy storage capacity as compared to NdYAG lasers. For this reason, the pulse repetition frequency at high peak powers is relatively high (20 kHz) as compared to NdYAG lasers.

In many applications, fibre lasers need to compete with the more mature diode pumped solid state lasers. In order to do so, much greater optical powers need to be achieved, with high reliability and lower cost.

An aim of the present invention is to provide an apparatus for providing optical radiation that reduces the above aforementioned problems.

SUMMARY OF THE INVENTION

According to a non-limiting embodiment of the present invention, there is provided apparatus for providing optical radiation comprising a pump array for providing pump radiation, a first pump combiner, and a waveguide, wherein the pump radiation from the pump array is coupled into the waveguide via the first pump combiner, and wherein the waveguide comprises a pump guide for guiding the pump radiation, and a gain medium which emits the optical radiation when it is pumped by the pump radiation.

The apparatus may comprise a plurality of pump arrays and a plurality of second pump combiners. The pump radiation emitted by each of the pump arrays may be combined together by different ones of the second pump combiners. The apparatus may comprise a beam shaper for spatially redistributing the pump radiation.

The first pump combiner may comprise an array of first pump waveguides. The first pump waveguides may be optical fibre waveguides. The optical fibre waveguides may comprise glass waveguides having a coating. The optical fibre waveguides may comprise microstructured fibres. The optical fibre waveguides may be configured to guide light within a circular core. The optical fibre waveguides may be configured to guide light within a non-circular core.

The array of first pump waveguides may be configured to have substantially the same cross-sectional shape as the pump guide.

The numerical aperture of the pump guide may be at least equal to the numerical aperture of the first pump waveguide. The numerical aperture of the pump guide may be at least 1.5 times the numerical aperture of the first pump waveguide. The numerical aperture of the pump guide may be at least 2 times the numerical aperture of the first pump waveguide.

The pump guide of the waveguide and the first pump waveguide of the first pump combiner may each be defined by a cross-sectional area and a numerical aperture, and the product of the pump guide's cross-sectional area and the square of its numerical aperture may be at least equal to the sum of the products of the first pump waveguides' cross-sectional areas and the squares of their numerical apertures.

The second pump combiners may each comprise an array of second pump waveguides. The second pump waveguides may be optical fibre waveguides. The optical fibre waveguides may comprise glass waveguides with a coating. The optical fibre waveguides may comprise microstructured fibres. The optical fibre waveguides may be configured to guide light within a circular core. The optical fibre waveguides may be configured to guide light within a non-circular core.

The numerical aperture of the pump guide may be at least equal to the numerical aperture of the second pump waveguide. The numerical aperture of the pump guide may be at least 1.5 times the numerical aperture of the second pump waveguide. The numerical aperture of the pump guide may be at least 2 times the numerical aperture of the second pump waveguide.

The product of the pump guide's cross-sectional area and the square of its numerical aperture may be at least equal to the sum of the products of the second pump waveguides' cross-sectional areas and the squares of their numerical apertures.

The waveguide may be end pumped. The waveguide may be core pumped. Alternatively or in addition the waveguide may be cladding pumped. Alternatively or in addition the waveguide may be side pumped.

The waveguide may be an optical fibre waveguide.

The waveguide may be a planar waveguide. The planar waveguide may be a glass waveguide. The planar waveguide may be a crystal waveguide. The crystal waveguide may comprise yttrium aluminium garnet (YAG).

The waveguide may comprise a core and a cladding. The core may be centrally located in the pump guide. The core may be offset from the centre of the pump guide. The waveguide may comprise a microstructured mesh surrounding the cladding. The waveguide may have two ends, and wherein the microstructure mesh is sealed in at least one of the ends of the waveguide.

The pump guide may have a circular cross-section.

The pump guide may include at least one flat surface. The pump guide may be substantially rectangular. The pump guide may have an aspect ratio of at least seven to one. The pump guide may have a D-shape.

The gain medium may comprise rare-earth dopant. The rare earth dopant may be selected from the group comprising Ytterbium, Erbium, Neodymium, Praseodymium, Thulium, Samarium, Holmium and Dysprosium, or is Erbium codoped with Ytterbium, or is Neodymium codoped with Ytterbium.

The rare earth dopant may comprise Ytterbium and the pump array may emit at a wavelength that is absorbed by the Ytterbium.

The rare earth dopant may be contained in the core. The rare earth dopant may be contained in the cladding. The rare earth dopant may be contained in both the core and the cladding.

The rare earth dopant may be provided in a region surrounding the centre of the waveguide. The region surrounding the centre of the waveguide may be a ring surrounding the core. The ring may have a thickness in the range 1 to 10 µm.

The gain medium may comprise stimulated Raman scattering. The gain medium may comprise stimulated Brillouin scattering.

The apparatus may comprise a plurality of first pump combiners and a plurality of waveguides. The waveguides may be configured in series. Alternatively or in addition, the waveguides may be configured in parallel. The apparatus may comprise a beam shaper for spatially redistributing the pump radiation. The waveguides may be configured such that optical radiation emitted from them is focused in substantially a common spot.

The apparatus may include feedback means.

The apparatus may comprise a source of input optical radiation.

The apparatus may include an optical switch. The optical switch may operate at a pulse repetition frequency in the range 100 Hz to 100 kHz. The pulse repetition frequency may be in the range 5 kHz to 10 kHz.

The pump array may comprise an array of single emitters.

The pump array may comprise a semiconductor laser bar.

The pump array may comprise a semiconductor laser stack.

The pump array may comprise an array of vertical cavity surface emitting lasers. The vertical cavity surface emitting lasers may be on a common substrate. The vertical cavity surface emitting lasers may be configured in a two dimensional array.

The apparatus may be in the form of an amplifier, a laser, a Q-switched fibre laser or a master oscillator power amplifier.

BRIEF DESCRIPTION OF THE DRAWINGS

Embodiments of the invention will now be described solely by way of example and with reference to the accompanying drawings in which.

DETAILED DESCRIPTION OF PREFERRED EMBODIMENTS OF THE INVENTION

Figure 1:
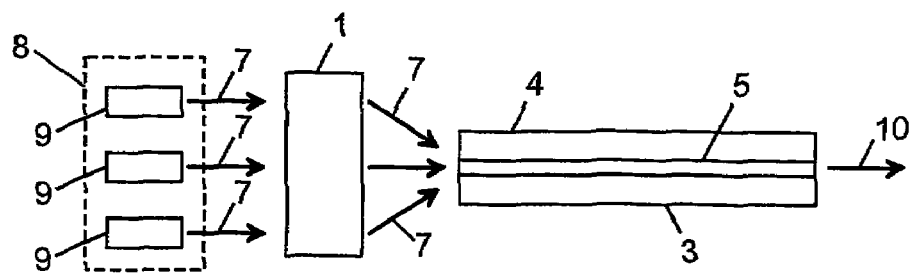
FIG. 1 shows an apparatus for providing optical radiation according to the present invention.

With reference to FIG. 1, there is provided apparatus for providing optical radiation 10 comprising a pump array 8 for providing pump radiation 7, a first pump combiner 1, and a waveguide 3, wherein the pump radiation 7 from the pump array 8 is coupled into the waveguide 3 via the first pump combiner 1, and wherein the waveguide 3 comprises a pump guide 4 for guiding the pump radiation 7, and a gain medium 5 which emits the optical radiation 10 when it is pumped by the pump radiation 7.

Figure 2:
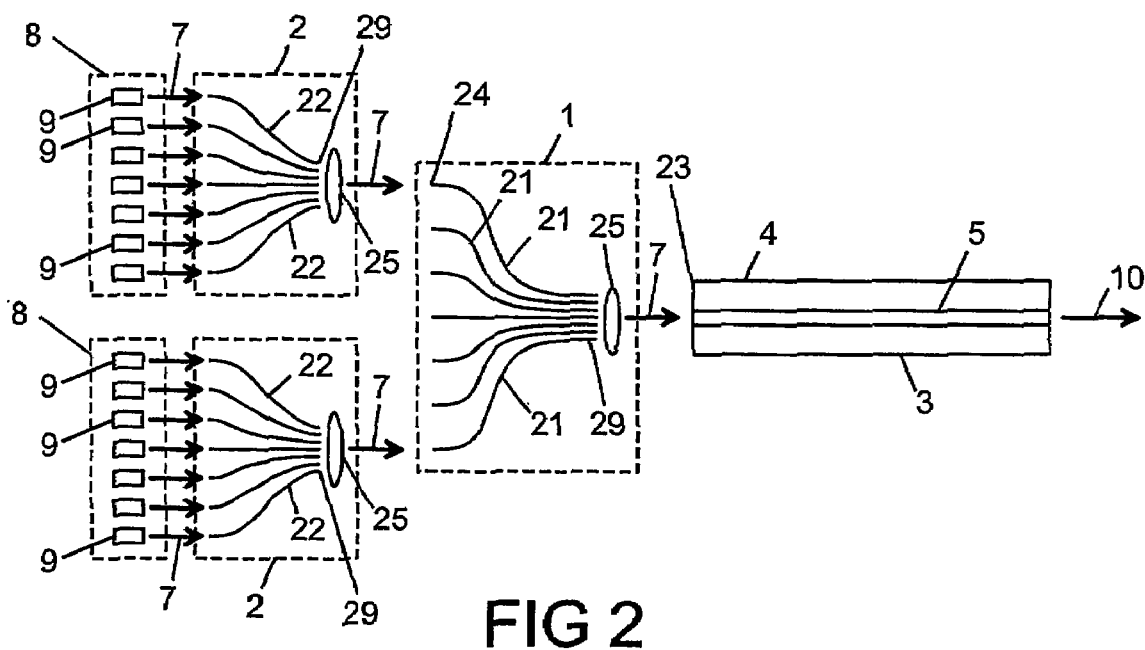
FIG. 2 shows an apparatus comprising a second beam combiner.

The pump array 8 shown in FIG. 1 comprises a plurality of pumps 9. There is shown in FIG. 2 apparatus comprising a plurality of pump arrays 8 and a plurality of second pump combiners 2. The pump radiation 7 emitted by each of the pump arrays 8 is combined together by different ones of the second pump combiners 2. The first pump combiner 1 is shown comprising an array of first pump waveguides 21. The first pump waveguides 21 may be optical fibre waveguides. Pump radiation 7 is coupled between the second pump combiners 2 and the first pump combiners 1 with a coupling means 25. The coupling means 25 may be a lens, an array of lenses, lenses formed on the ends of the first pump waveguides 21, a butt couple, or a fusion splice which may be tapered or non-tapered.

Figure 3:
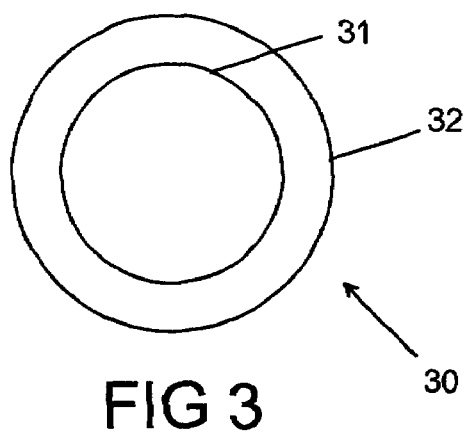
FIGS. 3 to 5 show examples of optical fibres.

FIG. 3 shows an optical fibre waveguide 30 comprising a glass core 31 and a coating 32. The coating 32 may be a polymer or a glass. An example of the optical waveguide 30 is plastic clad silica Such fibres typically have glass diameters of around 75 µm to 125 µm, but diameters in the range 50 µm to 2000 µm are feasible.

Figure 4:
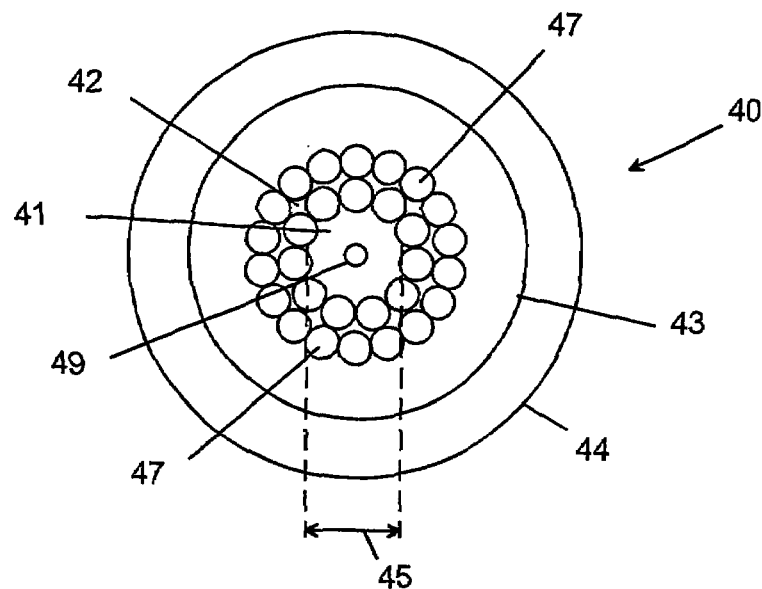

FIG. 4 shows an optical fibre waveguide in the form of a microstructured fibre 40 comprising a core 41, an air cladding 42 and a jacket 43. The air cladding 42 comprises longitudinally extending holes 47 which may be uniform and/or may rotate along the length of the fibre 40. The fibre 40 may optionally have a coating 44 which may be a polymer. The core diameter 45 can be in the range 10 µm to 500 µm. The core 41 can be undoped or may contain at least one dope region 49. The numerical aperture can be in the range 0.2 to 0.8, or higher (by increasing the ratio holes to solid material within the air cladding 42).

Figure 5:
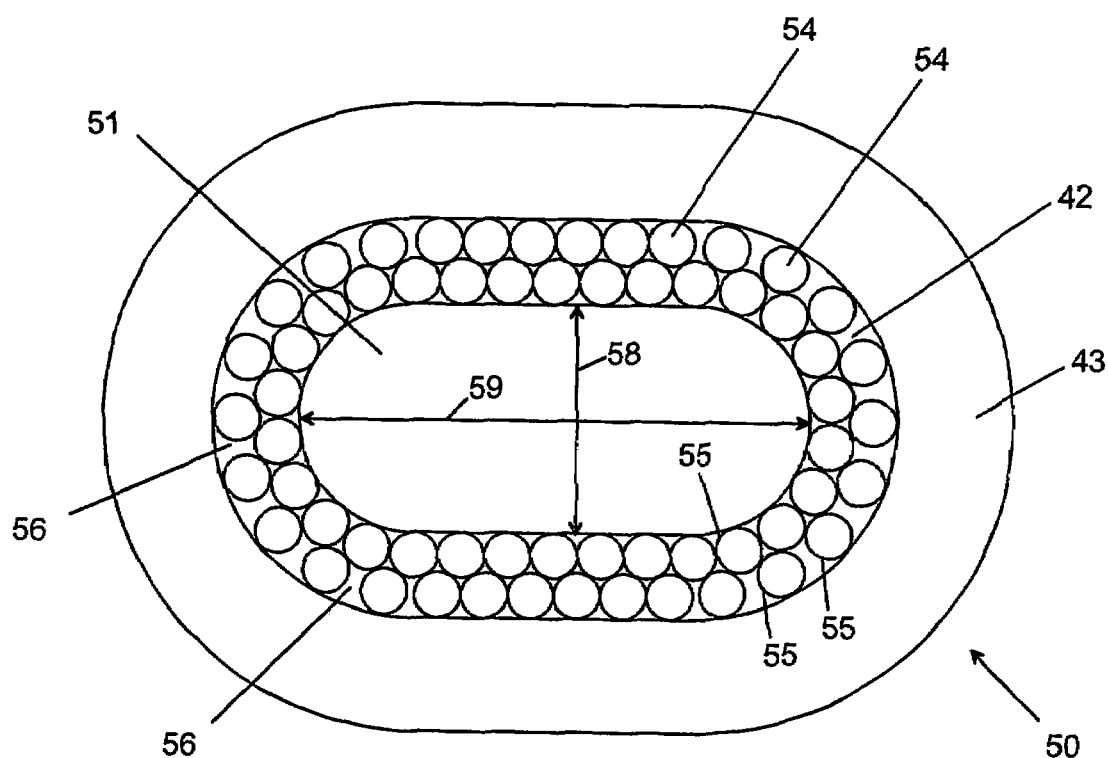

FIG. 5 shows an optical fibre waveguide in the form of a microstructured fibre 50 comprising a non-circular core 51, an air cladding 42 and a silica jacket 43. The air jacket 42 is formed from capillaries 55, and comprises longitudinally extending holes 54 and longitudinally extending holes 56 located in the interstitial spaces between the capillaries 55. The core 51 has a length 58 that is less than the length 59. The core 51 may be single mode at the pump wavelength in the direction 58 and multimode at the pump wavelength in the direction 59. The core 51 may be multimode at the pump wavelength in the direction 58 and multimode at the pump wavelength in the direction 59.

Fibres 30, 40, 50 and 60 are examples of the first and second pump waveguides 21, 22 shown in FIG. 2.

Figure 6:
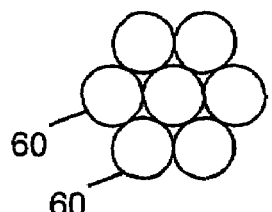
FIGS. 6 to 9 show examples of optical fibre arrangements.
Figure 7:
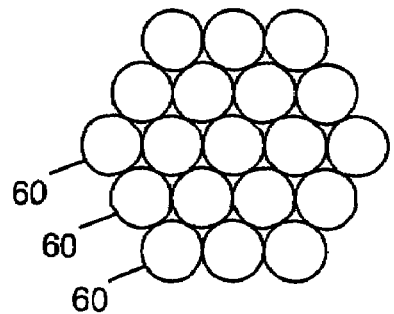
Figure 8:
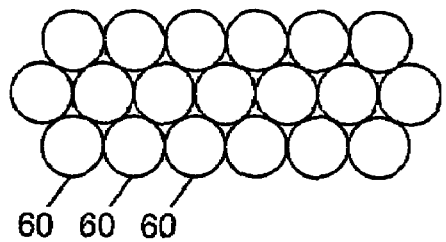

FIGS. 6, 7 and 8 show arrangements of circular waveguides 60. The circular waveguides may be the optical fibres 30 and/or 40. The waveguides 60 are shown close-packed in order to maximise the aggregate beam quality of light emitting from their cores. Alternative packing factors can be used. The waveguides 60 may be fusion spliced, welded, soldered, glued or glued together, and preferably have their end faces laser cleaved and/or polished.

Figure 9:
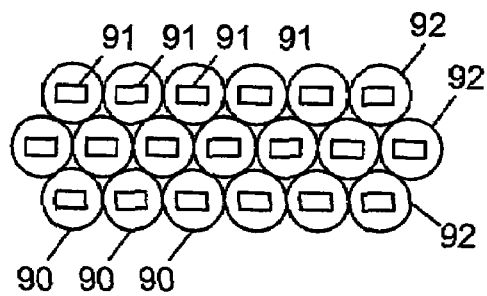

FIG. 9 shows arrangements of waveguides 90 having rectangular guiding regions 91 within an optional support structure. The waveguides 90 may be the fibre 50 shown with reference to FIG. 5. The arrangement illustrated by FIG. 9 reveals a problem in that the regions 91 are sparsely packed. This has the disadvantage of reducing the brightness or overall beam quality of the pump radiation that is launched into the waveguide 3.

Figure 10:
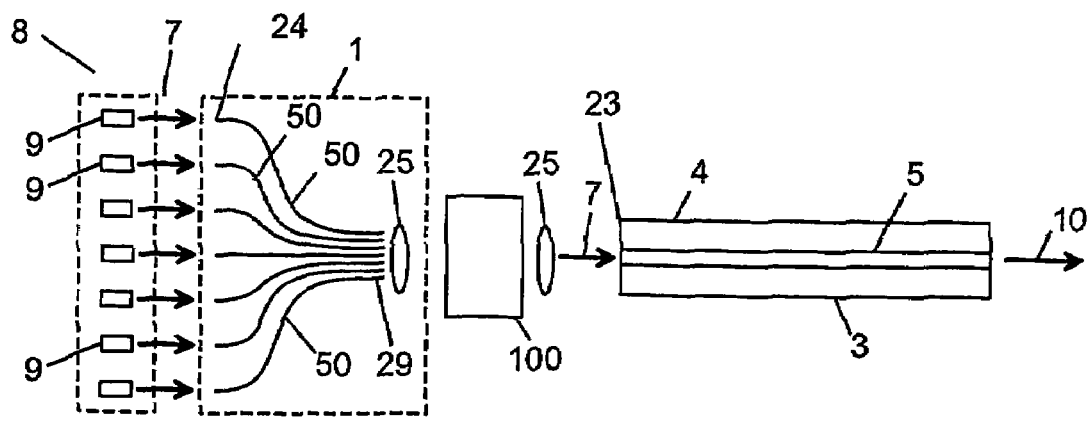
FIG. 10 shows an apparatus in the form of a Q-switched laser comprising an optical switch.

A solution to this reduction in brightness is illustrated in FIG. 10 where a beam shaper 100 is included between the first pump combiner 1 and the waveguide 3. The beam shaper 100 can comprise lenses at the end of each fibre 50 to collimate the beam. If a rectangular fibre is used (such as fibre 90) instead of fibre 50, then cylindrical lenses can be used to collimate the beam in each direction. Preferably the beam is expanded to fill the dead spaces prior to collimation. The first pump combiner 1 is shown as comprising fibres 50 shown with respect to FIG. 5—although any waveguides can be used in this arrangement. The beam shaper 100 removes at least some of the "dead space" between the pump radiation emitted from the regions 91 shown with respect to FIG. 9, thus increasing the overall brightness of the light emitted by the beam shaper 100. Beam shapers and brightness converters are described in U.S. Pat. Nos. 5,825,551 and 5,887,096 and PCT patent application Nos. WO 01/27686 and WO 96/02013 which are hereby incorporated herein by reference. The arrangement shown in FIG. 10 is particularly advantageous for preserving as much brightness as possible from the pump radiation emitted by laser diodes whose pump power is coupled into small core, high numerical aperture fibres (such as the fibres 40 or 50). The fibres 40, 50 can be coupled one each to the laser diodes, or there can be provided optics to couple light from more than one laser diode into each fibre 40, 50. Advantageously, a rectangular core fibre (such as fibre 50) can be used for semiconductor laser diodes that are edge emitting. Such high power laser diodes are often single moded in one direction, and multi-moded in the other direction, and this beam can be coupled into a rectangular core (such as fibre 50) designed such that the single mode direction is coupled into the width 58 that is smaller than the width 59. Preferably the rectangular core fibre is configured to substantially preserve mode number and mode order in order that the brightness from the laser diode is not degraded substantially. Thus for example the rectangular core fibre can be single-moded (or low moded) in one direction and multi-moded in the other direction. Similarly, a circular core fibre (such as fibre 40) can be used for semiconductor laser diodes that emit in a substantially symmetric manner (such as vertical cavity surface emitting lasers). The ability to preserve as much brightness from the light emitted by the laser diode is important for high power applications (1 W to several kW of average power) and for high peak power pulsed laser applications where keeping the length of the waveguide 3 as short as possible (eg by core pumping) is very important.

Referring to FIG. 2, the beam shaper 100 can be placed between the first and second pump combiners 1, 2 and/or between the first pump combiner 1 and the waveguide 3.

Referring to FIG. 2, the array of first pump waveguides 21 can have the same cross-sectional shape at end 29 as the cross-sectional shape of the pump guide 4 at end 23. Similarly, the array of second pump waveguides 22 can have the same cross-sectional shape at end 28 as the cross-sectional shape of one of the first pump waveguides 21 at end 24.

The numerical aperture of the pump guide 4 may be at least equal to the numerical aperture of the first pump waveguide 21. The numerical aperture of the pump guide 4 may be at least 1.5 times the numerical aperture of the first pump waveguide 21. The numerical aperture of the pump guide 4 may be at least 2 times the numerical aperture of the first pump waveguide 21. Increasing the numerical aperture of the waveguides as light propagates along the structure is advantageous for high-power lasers and amplifiers because it allows smaller diameter waveguides to be utilized.

In particular, the product of the pump guide's 4 cross-sectional area and the square of its numerical aperture (on end 23) is preferably at least equal to the sum of the products of the first pump waveguides' 21 cross-sectional areas and the squares of their numerical apertures. By cross-sectional area, it is meant the cross-section through which the pump radiation 7 is guided. Thus in FIG. 3, the cross-sectional area is the cross-sectional area of the glass core 31. And in FIGS. 4 and 5, the cross-sectional area is the cross-sectional area of the cores 41 and 51.

The design considerations for the second pump combiner 2 shown in FIG. 2 are similar to those for the first pump combiner 1 shown in FIGS. 2 and 10. Referring to FIG. 2, the second pump combiner 2 comprises an array of second pump waveguides 22 having an end 29. The second pump waveguides 22 may be optical fibre waveguides such as are shown with reference to FIGS. 3 to 5.

The numerical aperture of the pump guide 4 may be at least equal to the numerical aperture of the second pump waveguide 2. The numerical aperture of the pump guide 4 may be at least 1.5 times the numerical aperture of the second pump waveguide 22. The numerical aperture of the pump guide 4 may be at least 2 times the numerical aperture of the second pump waveguide 22.

The product of the pump guide's 4 cross-sectional area and the square of its numerical aperture is preferably at least equal to the sum of the products of the second pump waveguides' 22 cross-sectional areas and the squares of their numerical apertures.

The numerical aperture of the first pump waveguides 21 may be the same as the numerical aperture of the second pump waveguides 22.

The waveguide 3 may be end pumped (as shown in FIGS. 1, 2 and 10).

Figure 11:
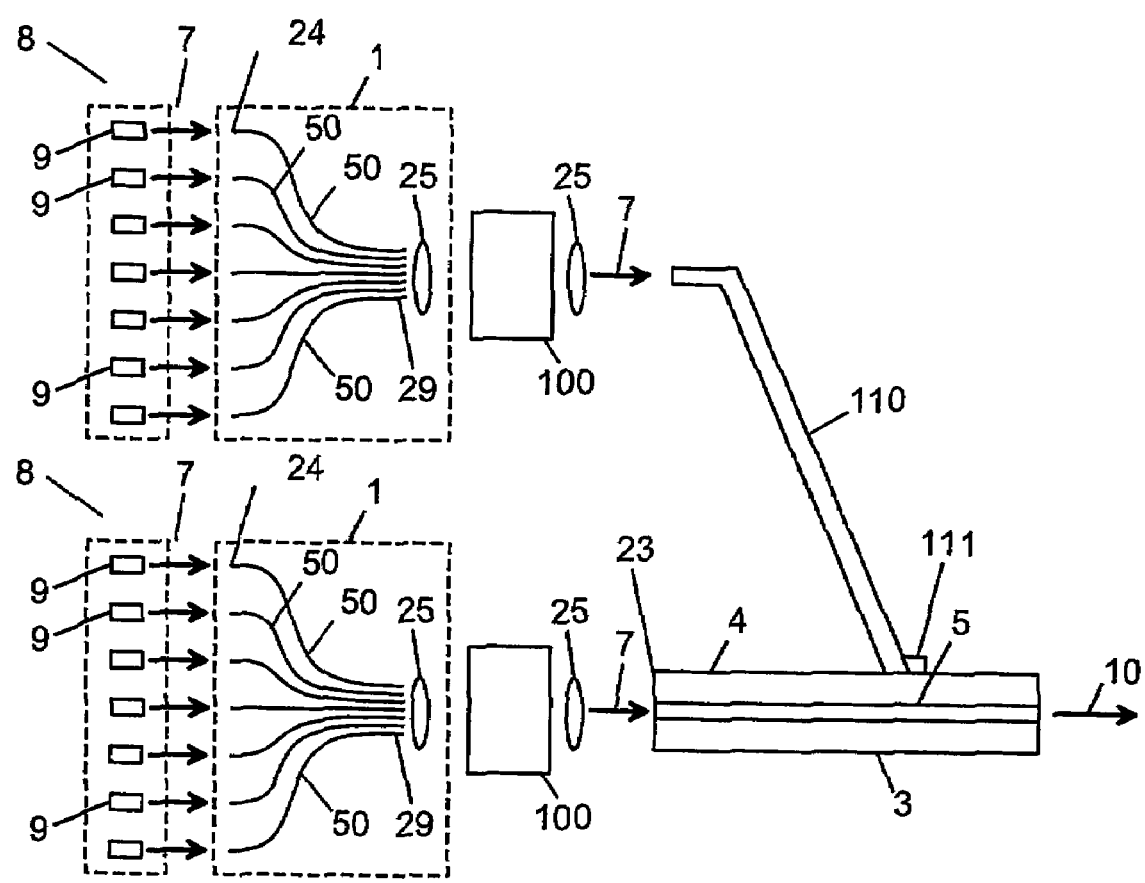
FIG. 11 shows an apparatus in which a waveguide is side pumped.

FIG. 11 shows a waveguide 3 that is both side pumped and end pumped. The side pumping is achieved using port 110 which may be a waveguide, or comprise free-space optics. The apparatus may include a reflection means 111 for reflecting at least some of the light escaping from the waveguide 3 back into the waveguide 3. The reflection means 111 may be a reflector, a retroreflector, a mirror, or a metallic surface. The reflection means 111 may be located on the surface of the waveguide 3, or located on the surface of a groove cut into the waveguide 3. Side pumping is useful for distributing the pump energy along a waveguide through a plurality of ports 110.

End and side pumping techniques are described in U.S. Pat. Nos. 4,674,830, 4,938,556 and 4,553,238, PCT patent application No. WO 96/20519, and European patent application No. 0893862 which are hereby incorporated herein by reference. Techniques include core pumping (whereby pump energy is launched into and is guided by the core of a waveguide) and/or cladding pumping (whereby pump energy is launched into and is guided by the cladding of a waveguide).

The waveguide 3 may be an optical fibre waveguide.

The waveguide 3 may be a planar waveguide. The planar waveguide may be a glass waveguide. The planar waveguide may be a crystal waveguide. The crystal waveguide may comprise YAG.

The waveguide 3 may be an optical fibre waveguide comprising a core and a cladding. The pump guide 4 can be the core and/or the cladding, or be formed by all or part of the core and/or all or part of the cladding.

Figure 12:
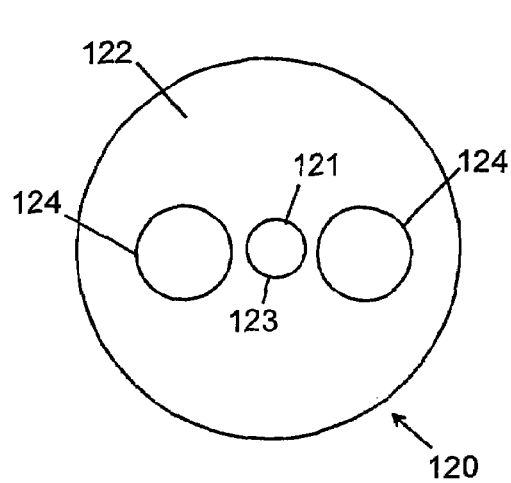
FIGS. 12 to 17 show examples of waveguides.

FIG. 12 shows an optical fibre 120 that comprises a core 121 and a cladding 122. The core 121 is located in the centre of the cladding 122. The fibre 120 comprises rare-earth doping 123, which may be located in the core 121 and/or the cladding 122. The fibre 120 also includes areas 124 of depressed refractive index that assist in mode coupling and thus greater efficiency in a cladding pumped waveguide. That is, the depressed areas 124 couple pump radiation 7 in modes propagating in the cladding 122 to other modes propagating in the cladding 122. The areas 24 may be stress rods designed to apply asymmetric thermal stress across the core 121 and thus induce birefringence.

Figure 13:
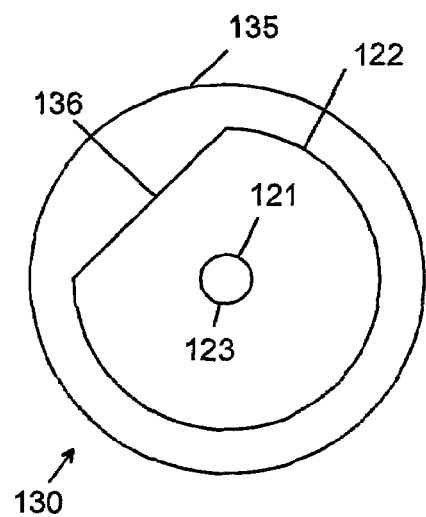

FIG. 13 shows an optical fibre 130 that comprises a flat surface 136 and a polymer coating 135 having a refractive index less than the cladding 122. The flat surface 136 will improve interaction of cladding modes with the core modes.

Figure 14:
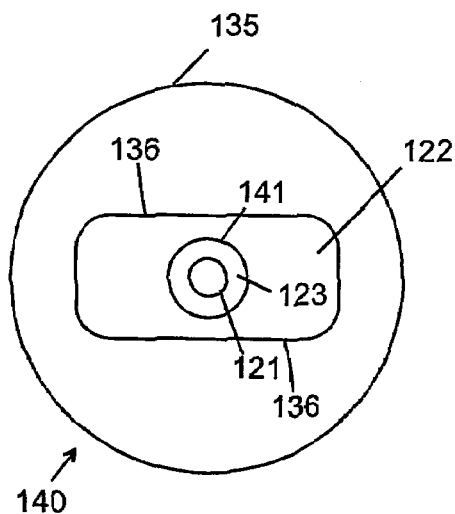

FIG. 14 shows an optical fibre 140 that comprises a plurality of flat surfaces 136. The fibre 140 is also shown as having an additional cladding 141. The cladding 141 can have a refractive index less than or equal to the cladding 122. The cladding 141 may be photosensitive and the core may contain rare-earth dopant 123. Alternatively or in addition, the cladding 141 may contain rare earth dopant 123 and the core 121 may be photosensitive. The separation of regions of photosensitivity and rare-earth dopants is important for applications involving fibre Bragg gratings written into the same fibre as that which provides optical gain—eg when using erbium ytterbium doping.

Figure 15:
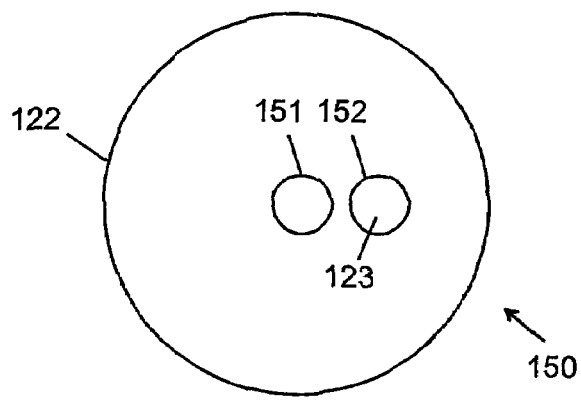

FIG. 15 shows a fibre 150 comprising a first core 151 and a second core 152. This arrangement is useful for separating a core 152 that provides gain (and thus is doped with rare-earth dopant 123) from a core 151 that provides guidance.

Figure 16:
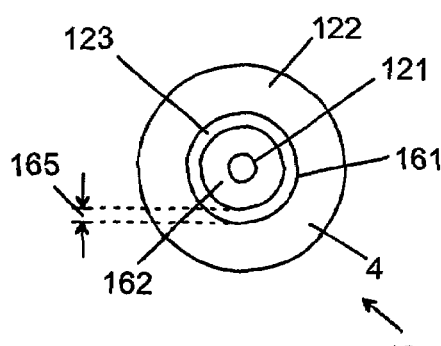

FIG. 16 shows a fibre 160 comprising a region 161 containing rare-earth dopant adjacent to the core 121. In the configuration shown, there is an inner cladding 162 and the region 161 surrounds the core 121, the region 161 being in the form of a ring. The ring may have a thickness 165 in the range 1 to 10 µm. This configuration is important because it is often possible to store more optical energy in a ring-doped fibre than it is in a fibre in which the rare-earth dopant is contained in the core (as shown in FIG. 12).

Figure 17:
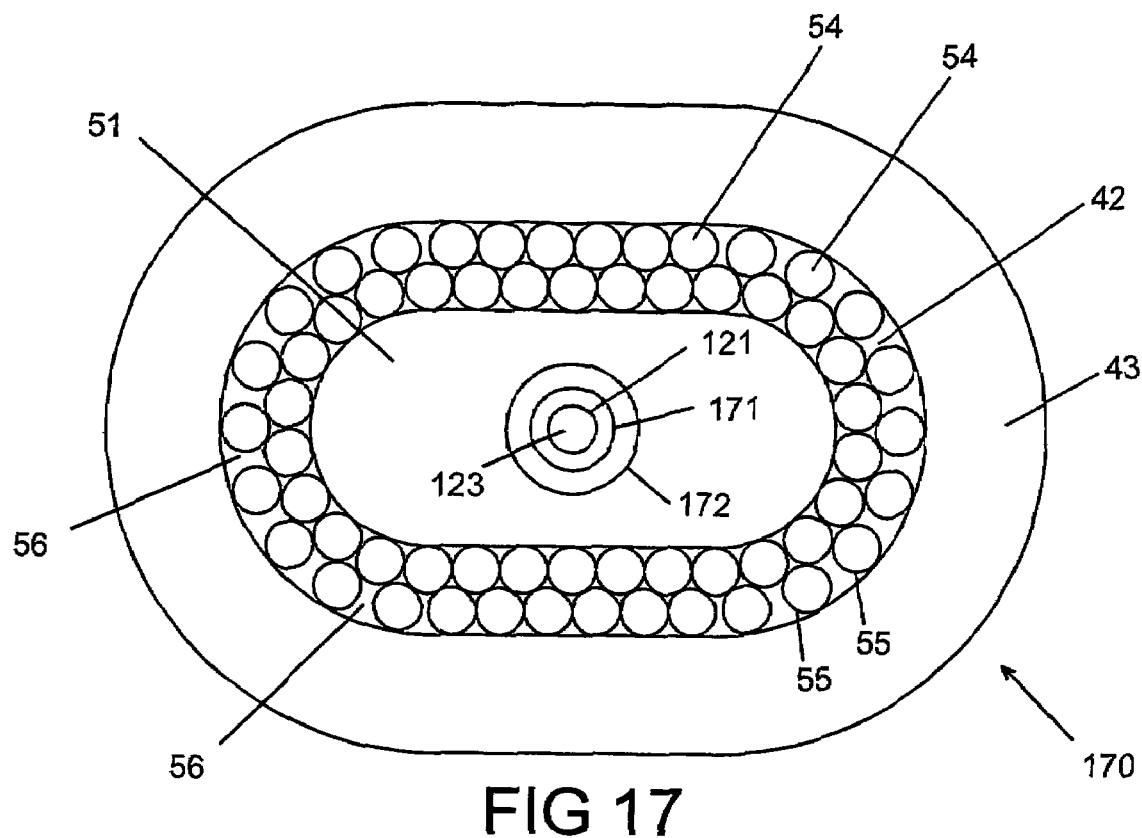

FIG. 17 shows a fibre 170 similar to the fibre 40 shown with reference to FIG. 4, but containing a core 121. The fibre 170 may optionally have additional claddings 171, 172 and may be ring doped or core doped with rare-earth dopants. The fibre 170 has the advantage that the core 51 can guide the pump radiation (ie the core 51 acts as the pump guide 4). Reducing the size of the core 51 (which can be circular) can lead to shorter devices and corresponding reductions in non-linear effects. The pump guide 4 may be substantially rectangular. The pump guide 4 may be single mode along its minor axis and multimode along its major axis. The core 51 may have an aspect ratio of at least seven to one. For high power devices, the air cladding 42 is preferably thin, for example, in the range 5 to 50 um. The air cladding 42 may comprise a microstructured mesh surrounding the cladding 51. The air cladding 51 is preferably sealed in at least one of the two ends of the fibre 170.

There are various design features in the fibres 120, 130, 140, 150, 160, 170. Design features in one of these fibres can be used in another one of these fibres, and these fibres form examples of the waveguide 3. The cores 121 of these waveguides 3 can be conventional step index cores, or be of a more complex design, for example a large mode area waveguide such as that described in U.S. Pat. No. 6,614,975 which is hereby incorporated herein by reference. Other examples of the waveguide 3 include so-called holey or microstructured fibres.

The gain medium 5 may comprise rare-earth dopant 123 as described with reference to FIGS. 12 to 17. The rare earth dopant 123 may comprise a rare earth dopant selected from the group comprising Ytterbium, Erbium, Neodymium, Praseodymium, Thulium, Samarium, Holmium and Dysprosium, or is Erbium codoped with Ytterbium, or is Neodymium codoped with Ytterbium, or is doped with a transition metal or semiconductor.

The rare earth dopant 123 may comprise Ytterbium and the pump array 8 may emit at a wavelength that is absorbed by the Ytterbium.

The gain medium 5 may comprise stimulated Raman scattering. The gain medium 5 may comprise stimulated Brillouin scattering.

Figure 18:
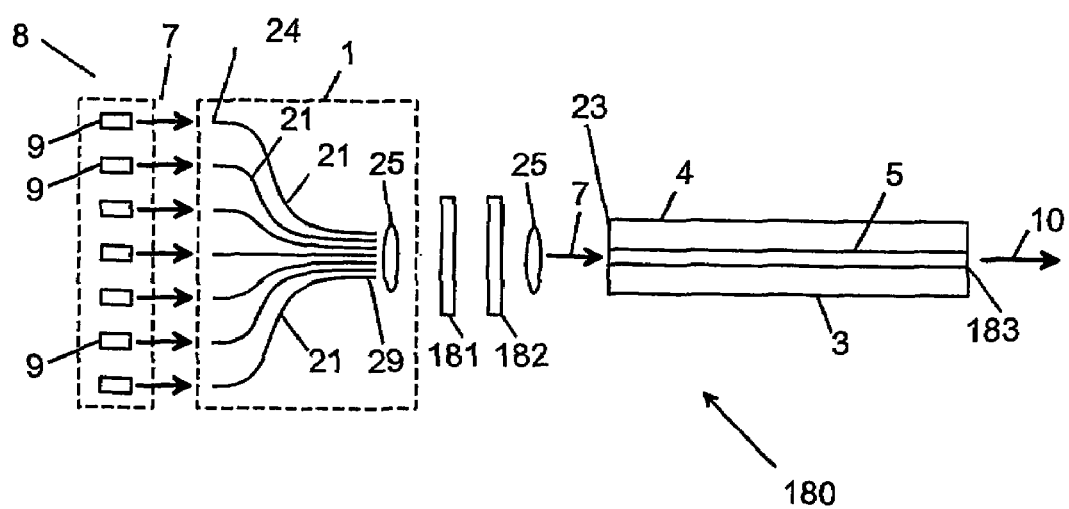
FIG. 18 shows an apparatus in the form of a laser.

FIG. 18 shows apparatus in the form of a laser 180 comprising feedback means 181, 182. The feedback means 181 is a dichroic mirror. The feedback means 182 is the end reflection from the end face of the waveguide 3. Alternative feedback means 181, 182 include reflectors, fibre Bragg gratings, gratings and other means of feeding back output from the waveguide 3 back into the waveguide 3 can be used. Optionally, the apparatus may include a switch 182 and the apparatus is then in the form of a Q-switched laser. The optical switch 182 may be operated at a pulse repetition frequency in the range 100 Hz to 100 kHz. The pulse repetition frequency may be in the range 5 kHz to 10 kHz.

Figure 19:
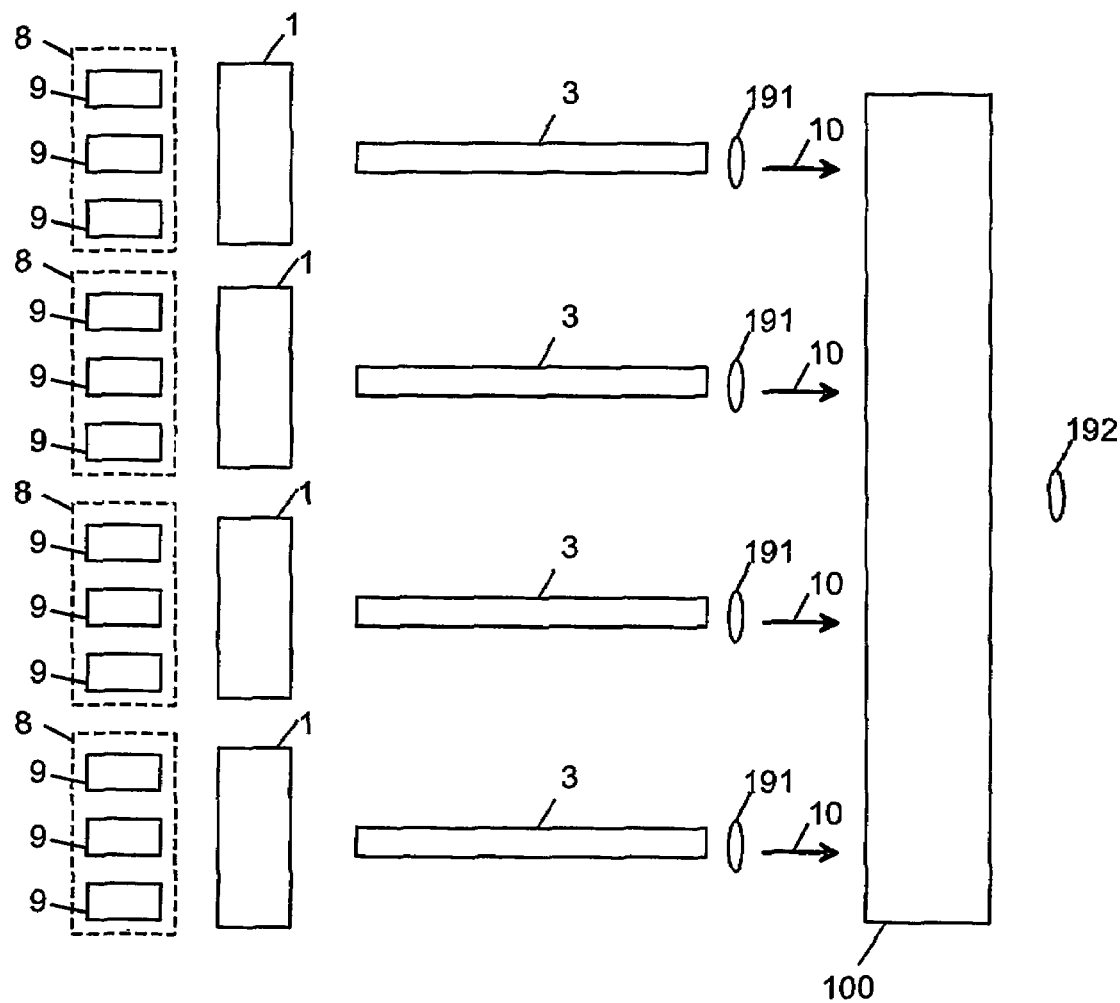
FIG. 19 shows an apparatus comprising parallel waveguides.

The apparatus may comprise a plurality of first pump combiners 1 and a plurality of waveguides 3 as shown in FIG. 19 which also shows an optional beam shaper 100 (such as those described with reference to FIG. 3) for increasing the aggregate brightness of the optical radiation 10 emitted by the waveguides 3. Alternatively or additionally, the waveguides 3 may be configured such that optical radiation 10 is focused in substantially a common spot. This can be achieved for example by appropriate collimating lenses 191 at the output of the waveguides 3 and a second focusing lens 192 for focusing the beams. Advantageously, the waveguides 3 may be non-parallel to each other. This arrangement is particularly useful for materials processing applications (such as laser welding and laser machining).

FIG. 19 shows the waveguides 3 configured in parallel. Alternatively or in addition, the waveguides 3 may be configured in series with the output from a preceding waveguide 3 being amplified by the following waveguide 3.

Figure 20:
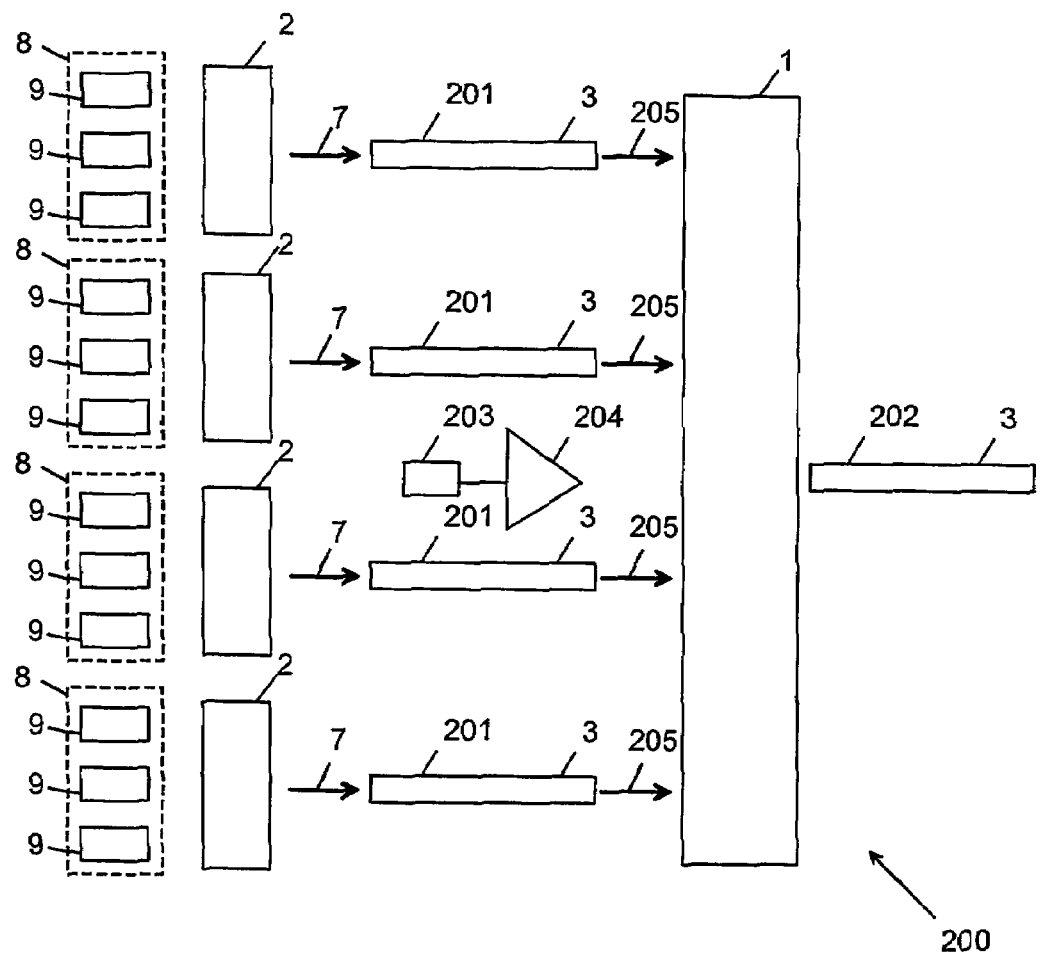
FIG. 20 shows an apparatus in the form of a master oscillator power amplifier.

FIG. 20 shows apparatus in the form of a master oscillator power amplifier (MOPA) 200. Laser emission from an oscillator 203 is amplified by an optional pre-amplifier 204 and transmitted through to the waveguide 202 by the first beam combiner 1. The oscillator 203 may be a distributed feedback laser, a laser diode, a distributed feedback fibre laser, a pulsed laser, a femtosecond laser, a picosecond laser, or a Q-switched laser. Preferably the oscillator 203 is a laser diode which can be directly modulated or gain switched. This is advantageous because a variety of pulse shapes and durations can be achieved which is important for materials processing applications such as welding, drilling and cutting. Suitable pulse repetition frequencies for the oscillator 203 are in the range 100 Hz to 10 MHz, with 10 kHz to 250 kHz being attractive for many materials processing applications. In these frequency ranges, the peak power emitted by a laser diode can be very much higher than the peak power emitted in many high-frequency applications (such as telecommunications), the damage limitation of the laser diode being the average power output from the laser diode. Suitable peak powers that can be achieved from a laser diode are 50 mW to 10 W.

Pump radiation 7 from the pump arrays 8 is also routed through to the waveguide 202 via the first and second beam combiners 1, 2. Optionally, the MOPA 200 may comprise waveguides 201 for converting multimode pump radiation 7 into single mode pump radiation 205. For example, the waveguides 201 may comprise the fibre 130 which may be ring doped with Ytterbium. When the Ytterbium is pumped by 915 nm laser diodes, it will emit laser radiation in the 980 nm window which can be used to pump Ytterbium ions doped in the waveguide 202 in a wavelength range 1040 nm to 1140 nm. Alternatively, waveguides 201 may emit laser radiation in the wavelength range 1040 nm to 1140 nm and this can be used to provide a pump source for Raman or Brillouin amplification in waveguide 202.

The pump array 8 shown in the preceding Figures may comprise an array of single emitters, a semiconductor laser bar, a semiconductor laser stack, or an array of vertical cavity surface emitting lasers. The vertical cavity surface emitting lasers may be on a common substrate. The vertical cavity surface emitting lasers may be configured in a two dimensional array. The invention has particular application when the total pump power emitted by the pump arrays 8 is in the range 10 W to 10 kW, and more importantly when the total pump power is in the range 100 W to 10 kW.

Figure 21:
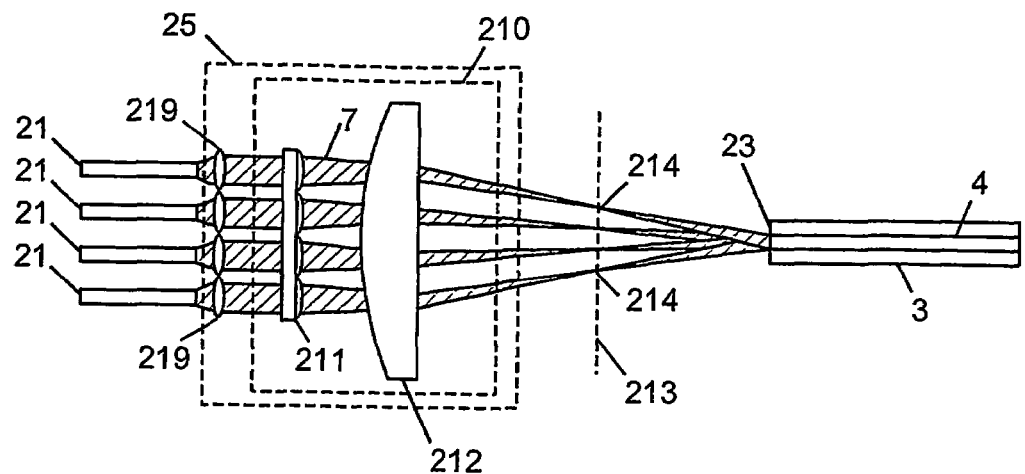
FIG. 21 shows a coupling means in the form of a diffracting multi-aperture beam integrator.

FIG. 21 shows an example of a coupling means 25 that comprises an array of collimating lenses 219 and a diffracting multi-aperture beam integrator 210. The integrator 210 comprises an array of lenses 211 (which can be a lenslet array or an array of individual lenses) and a primary focusing element 212. The advantage is that the pump radiation 7 from the individual first pump waveguides 21 is focused at a plurality of points 214 in a common plane 213 although the pump radiation 7 can still be made to fill substantially the same numerical aperture of the pump guide 4 as it would have done without the array of lenses 211. The arrangement is advantageous because (i) it can avoid problems due to ionization of air if all beams were to be focused at the same point; (ii) the peak intensity of the pump radiation 7 on the end face 23 of the waveguide 3 can be slightly reduced (ie hot spots can be avoided) resulting in a larger optical damage threshold; and (iii) the arrangement is more tolerant to longitudinal and transverse misalignment of the waveguides 21, 3 and the lenses 211, 212, 219 (for example due to thermal effects, vibration, or ageing). Note that the combination of both collimating lenses 219 and the lens array 211 is not strictly required since a single lens array 211 can be used to provide the composite function.

Figure 22:
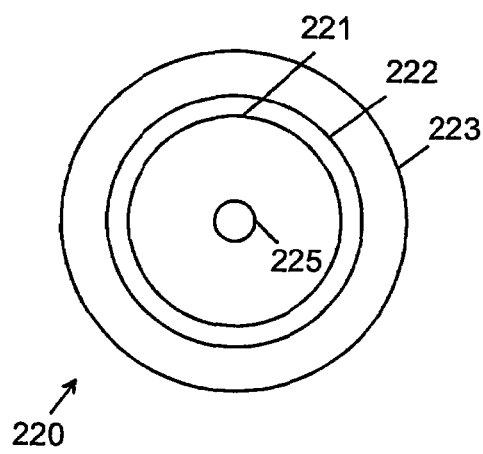
FIG. 22 shows a triple clad fibre.

FIG. 22 shows a triple clad fibre 220 comprising a core 225, and first, second and third claddings 221, 222, 223. In a preferred embodiment, the first and second claddings 221, 222 are glass claddings, and the third cladding 223 is a polymer cladding. The first cladding 221 may be a silica cladding, and the second cladding 222 may be a fluorosilicate cladding such as Fluorosilicate SWS 1.4 made by Hereaus Tenevo which has a numerical aperture of 0.22 with respect to silica (silica having a higher refractive index). The third cladding 223 may be an ultra-violet curing polymer such as a fluorine-added acrylate polymer. Examples of fluorine-added acrylate polymers are Luvantix Efiron PC-375 and DSM Resins 5D1-63—these have a numerical aperture approximately 0.45 below silica. The core 225 can be a single mode or a multimode core. The triple clad fibre 220 has high power handling capability of power that is guided by the first cladding 221. This is because only the high angle rays propagating along the first cladding 221 with a numerical aperture higher than the numerical aperture of the second cladding 222 see the third cladding 223. The triple clad design used in the triple clad fibre 220 can be implemented in any of the fibres described in the specification in order to increase their power handling, including the first and second pump waveguides 21, 22, and the fibres shown in FIGS. 3-5 and 12-17. For example, in FIG. 5, the capillaries 55 and the silica jacket 43 can be fabricated from fluorosilicate, and the silica jacket 43 can then be coated with an ultra-violet curing polymer. Such a design will increase the numerical aperture of the non-circular core 51.

Figure 23:
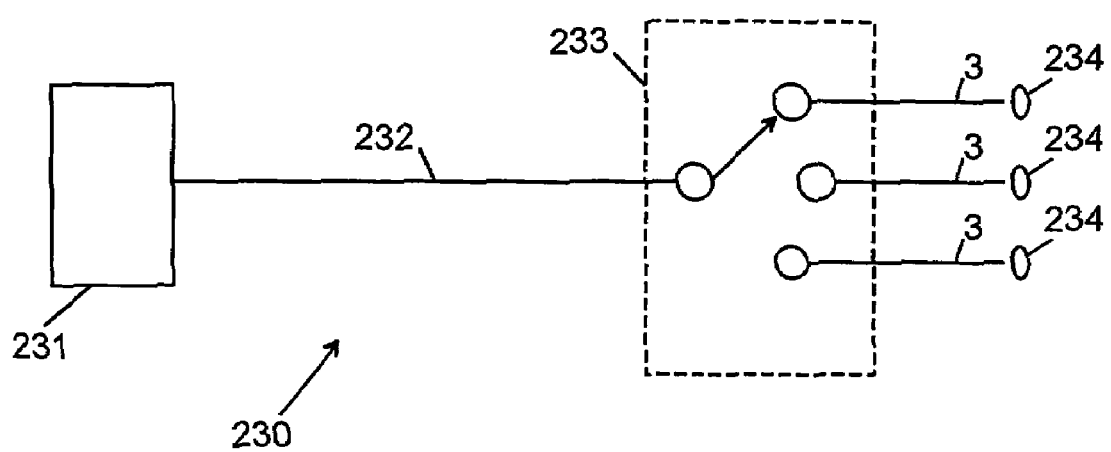
FIG. 23 shows an apparatus in the form of a laser comprising a transmission cable.

FIG. 23 shows an apparatus in the form of a laser 230. A pump module 231 emits pump radiation 7 (not shown) into a transmission cable 232, which is then used to pump at least one waveguide 3. The laser 230 may comprise an optical switch 233 so that the pump radiation 7 can be routed to different waveguides 3 whose output can be focused using lenses 234. The transmission cable 232 can comprise at least one optical fibre which may be between 1 m and 1 km long. The optical fibres may be the first or the second pump waveguides 21, 22, or may be additional fibres for transmitting pump power to the waveguide 3. The arrangement shown in FIG. 23 is particularly advantageous for high power lasers (1 W to 100 W or higher) because it is possible to transmit pump radiation 7 longer distances through optical fibres than a higher brightness laser signal. This is because non-linear processes such as Raman scattering and damage effects limit the transmission distances of high power, high-brightness laser radiation. The arrangement is particularly attractive because it facilitates the pump module 231 being located in locations, which are readily serviced within factories whilst having the active medium (ie the waveguide 3) near to the laser machine. The pump module 231 can comprise the arrangements shown with respect to FIGS. 1, 2, 10, 11, 18, 19, 20 and 21, minus the output waveguide 3.

The apparatus may be in the form of an amplifier, a laser, a Q-switched fibre laser or a master oscillator power amplifier.

It is to be appreciated that the embodiments of the invention described above with reference to the accompanying drawings have been given by way of example only and that modifications and additional components may be provided to enhance performance. In addition, the invention can be considered to be a laser, a Q-switched laser, or a master oscillator power amplifier.

The present invention extends to the above-mentioned features taken in isolation or in any combination.

The invention claimed is:

1. Apparatus for providing optical radiation, comprising:
   a pump array configured to provide pump radiation;
   a first pump combiner, comprising a coupling means and a pump waveguide disposed between the pump array and the coupling means;
   a plurality of waveguides, each waveguide comprising a pump guide for guiding the pump radiation, and a gain medium which emits the optical radiation when it is pumped by the pump radiation;
   a transmission cable disposed between the coupling means and the waveguides; and
   an optical switch for routing the pump radiation to different ones of the waveguides.

2. Apparatus according to claim 1 further comprising a plurality of pump arrays and a plurality of second pump combiners, wherein pump radiation emitted by each of the pump arrays is combined together by different ones of the second pump combiners.

3. Apparatus according to claim 2 wherein the second pump combiner comprises an array of second pump waveguides.

4. Apparatus according to claim 3 wherein the second pump waveguides are optical fibre waveguides.

5. Apparatus according to claim 4 wherein the optical fibre waveguides have a non-circular core.

6. Apparatus according to claim 5 wherein the pump array comprises at least one laser diode that is single moded in a first direction and multimoded in a second direction, and the optical fibre waveguide is low moded in the first direction and multimoded in the second direction.

7. Apparatus according to claim 6 wherein the optical fibre waveguide is single-moded in the first direction.

8. Apparatus according to claim 1 wherein the transmission cable has a length between 1 m and 1 km.

9. Apparatus according to claim 1 wherein the pump array is located in a location that is readily serviced within a factory.

10. Apparatus according to claim 1 further comprising a beam shaper for spatially redistributing the pump radiation.

11. Apparatus according to claim 1 wherein the first pump combiner comprises an array of first pump waveguides.

12. Apparatus according to claim 11 wherein the first pump waveguides are optical fibre waveguides.

13. Apparatus according to claim 12 wherein the optical fibre waveguides have a non-circular core.

14. Apparatus according to claim 13 wherein the pump array comprises at least one laser diode that is single moded in a first direction and multimoded in a second direction, and the optical fibre waveguide is low moded in the first direction and multimoded in the second direction.

15. Apparatus according to claim 14 wherein the optical fibre waveguide is single-moded in the first direction.

16. Apparatus according to claim 1 wherein the pump guide includes at least one flat surface.

17. Apparatus according to claim 1 wherein the gain medium comprises at least one rare-earth dopant selected from the group comprising Ytterbium, Erbium, Neodymium, Praseodymium, Thulium, Samarium, Holmium and Dysprosium.

18. Apparatus according to claim 1 and comprising a plurality of first pump combiners.

19. Apparatus according to claim 1 and comprising a source of input optical radiation.

20. Apparatus according to claim 19 wherein the optical switch is operated at a pulse repetition frequency in the range 100 Hz to 100 kHz.

21. Apparatus according to claim 20 wherein the pulse repetition frequency is in the range 5 kHz to 10 kHz.

22. Apparatus according to claim 1 wherein the pump array comprises a plurality of single emitters.

23. Apparatus according to claim 1 wherein the pump array comprises a semiconductor laser bar.

24. Apparatus according to claim 1 wherein the pump array comprises a semiconductor laser stack.

25. Apparatus according to claim 1 wherein the pump array comprises an array of vertical cavity surface emitting lasers.

26. Apparatus according to claim 1 and in the form of an amplifier, a laser, a Q-switched fibre laser or a master oscillator power amplifier.

* * * * *